United States Patent
Senoo et al.

(10) Patent No.: US 8,049,902 B2
(45) Date of Patent: Nov. 1, 2011

(54) MOBILE VEHICLE

(75) Inventors: Toshihiro Senoo, Osaka (JP); Keisuke Hara, Osaka (JP); Tsuyoshi Ogawa, Osaka (JP); Akihiro Okazaki, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 204 days.

(21) Appl. No.: 11/631,260

(22) PCT Filed: Jun. 24, 2005

(86) PCT No.: PCT/JP2005/011584
§ 371 (c)(1),
(2), (4) Date: Dec. 29, 2006

(87) PCT Pub. No.: WO2006/003841
PCT Pub. Date: Jan. 12, 2006

(65) Prior Publication Data
US 2007/0203622 A1 Aug. 30, 2007

(30) Foreign Application Priority Data
Jul. 1, 2004 (JP) .................................. 2004-195332

(51) Int. Cl.
*G01B 11/14* (2006.01)
(52) U.S. Cl. .......................................... 356/614; 15/319
(58) Field of Classification Search ................. 356/614; 15/319
See application file for complete search history.

(56) References Cited

U.S. PATENT DOCUMENTS

| | | | | |
|---|---|---|---|---|
| 5,319,443 A | * | 6/1994 | Watanabe et al. | 356/614 |
| 5,341,540 A | * | 8/1994 | Soupert et al. | 15/319 |
| 5,613,269 A | * | 3/1997 | Miwa | 15/319 |
| 5,907,229 A | * | 5/1999 | Snell | 318/569 |
| 6,337,742 B2 | * | 1/2002 | Lysen et al. | 356/614 |
| 6,868,307 B2 | * | 3/2005 | Song et al. | 700/245 |
| 2002/0189045 A1 | * | 12/2002 | Mori et al. | 15/319 |
| 2004/0181896 A1 | * | 9/2004 | Egawa et al. | 15/319 |
| 2004/0230340 A1 | * | 11/2004 | Fukuchi et al. | 700/245 |
| 2004/0255425 A1 | * | 12/2004 | Arai et al. | 15/300.1 |
| 2005/0131581 A1 | * | 6/2005 | Sabe et al. | 700/245 |
| 2005/0192707 A1 | * | 9/2005 | Park et al. | 700/259 |

FOREIGN PATENT DOCUMENTS

| JP | 2003-180586 A | 7/2003 |
|---|---|---|
| JP | 2004-5324 A | 1/2004 |

* cited by examiner

*Primary Examiner* — Tarifur Chowdhury
*Assistant Examiner* — Isiaka Akanbi
(74) *Attorney, Agent, or Firm* — Birch, Stewart, Kolasch & Birch, LLP

(57) ABSTRACT

A mobile vehicle provided with moving means and a moving control device automatically travels while detecting an advance distance and a turning angle by means of one optical displacement sensor. The mobile vehicle comprises a moving unit (2) for moving a body (1), one optical displacement sensor (7) as a displacement sensor provided on the body (1), and a moving control device for controlling the moving unit (2) based on a moving distance detected by the optical displacement sensor (7). The moving control device determines the distance of rectilinear movement and a turning angle of the body (1) from an amount detected by the optical displacement sensor (7). The optical displacement sensor (7) picks up patterns or the like on a traveling floor surface at specified time intervals and detects a moving distance by comparing images before and after the specified time.

8 Claims, 2 Drawing Sheets

MOBILE VEHICLE

TECHNICAL FIELD

The present invention relates to a mobile vehicle capable of forward/backward rectilinear movement and turning movement.

BACKGROUND ART

A mobile robot has been proposed which has a traveling device, a travel control means, various sensors and a working device, and which automatically performs various working operations while traveling or after moving to a destination position. For example, a mobile cleaning robot is a robot for performing a cleaning function as one of the working functions, having cleaning means such as suction nozzle and a brush provided on a main body bottom surface, drive and steering means provided as moving functions, obstruction detection means for detecting obstructions such as walls, pillars, pieces of furniture and office machines, and position recognition means for recognizing the self-position. While obstructions such as surrounding walls and pillars in a cleaning place are being detected with the obstruction detection means, the self-position is recognized by the position recognition means and travels are made in a predetermined cleaning are to perform predetermined cleaning operations.

A mobile cleaner has been proposed (Patent Document 1) which has a plurality of optical travel distance sensors which detect movement distances in two dimensions from changes between optical images of a floor surface, a movement amount detection section which detects movement distances in two dimensions and a turning angle through which a cleaner main body has been moved on the basis of the movement distances in two dimensions detected with the sensors, and a movement control section which controls the movement of the cleaner main body on the basis of the detected movement distances in two dimensions and turning angle. The mobile cleaner is designed to accurately control the robot body by detecting the movement distances and turning angle with high accuracy. Patent Document 1: Japanese Patent Laid-Open Publication No. 2003-180586 (paragraphs [0036] to [0039], FIGS. 1 to 5).

A plurality of optical displacement sensor units must be provided in this conventional mobile vehicle. This is a cause of an increase in cost. It is important to reduce the size of the main body in the case of movement in a room of an ordinary house for example, while there is a need to prepare a space for providing a plurality of sensors. A rotational speed sensor for detecting the amount of rotation of wheels is provided as a means for measuring the distance through which the mobile vehicle moves. However, the rotational speed sensor is a restriction on the position and space for placement of a wheel system including wheels, and is a cause of hindrance to the reduction in size of the mobile vehicle.

In a mobile vehicle having moving means for moving a main body, a displacement sensor provided on the main body, and movement control means for controlling the moving means on the basis of a detected value detected by the displacement sensor, there is a subject to be solved that is to enable detection of the distance of forward/backward rectilinear movement and the in place turning angle of the mobile vehicle by means of one displacement sensor.

DISCLOSURE OF THE INVENTION

An object of the present invention is to provide a mobile vehicle which has moving means and a movement control device for the moving means, which is capable of automatically traveling while knowing the present position and orientation by obtaining the forward/backward rectilinear movement distance during forward/backward rectilinear movement and the turning angle during in-place rotation by using one displacement sensor, and which can be designed to achieve space-saving and cost-reducing effects.

A mobile vehicle comprising a moving means for moving a main body, the moving means being provided on the main body, a displacement sensor provided on the main body, and a movement control means for controlling the moving means on the basis of a detected value detected by the displacement sensor, the mobile vehicle being characterized in that the movement control means designates a pattern of movement of the mobile vehicle by the moving means for a forward/backward rectilinear movement or an in-place rotational movement; the displacement sensor is one optical displacement sensor for taking images of a travel floor surface, the displacement sensor being placed at a position other than a position on a rotation center axis line around which the mobile vehicle performs the in-place rotational movement, the displacement sensor having, as displacement detection axes orthogonal two axes formed of a front-rear axis corresponding to a vehicle front-rear center line passing through the rotation center axis line and a left-right axis parallel to a vehicle left-right center line passing through the rotation center axis line and perpendicular to the vehicle front-rear center line; and the movement control means obtains a forward/backward rectilinear movement distance as a displacement in the front-rear axis direction from the detected value with respect to the front-rear axis direction detected in a case where the pattern of movement of the mobile vehicle is designated for the forward/backward rectilinear movement, on the basis of data on changes between the images of the travel floor surface taken by the optical displacement sensor, and obtains an in-place turning angle by successively integrating the angle estimated about the rotation center axis line with respect to each of infinitesimal displacements in the left-right axis direction obtained from the detected value with respect to the left-right axis direction detected in a case where the pattern of movement of the mobile vehicle is designated for the in-place rotational movement.

According to this mobile vehicle, since the pattern for movement of the mobile vehicle by the moving means is designated for forward/backward rectilinear movement or in-place rotational movement, taking of images of a pattern or the like on a travel floor surface at predetermined time intervals and comparison between the images obtained one after another with time for example enable the distance of forward/backward rectilinear movement to be obtained as a displacement in the front-rear axis direction from the detected value with respect to the front-rear axis direction detected when the pattern of movement of the mobile vehicle is designated for the in-place rectilinear movement, and the in-place turning angle to be obtained by successively integrating the angle estimated about the rotation center line axis with respect to each of infinitesimal displacements in the left-right axis direction obtained from the detected value with respect to the left-right axis direction detected when the pattern of movement of the mobile vehicle is designated for the in-place rotational movement, even if the displacement sensor is one optical displacement sensor. Also, cne optical displacement sensor is provided to eliminate the need to provide a rotation sensor for detecting the rotation of wheels at the wheel system and to remove the restriction on the space for placement of a plurality of optical displacement sensors, thus achieving space saving. Further, the number of sensors to be disposed is reduced to achieve a reduction in cost and to make it possible to provide at a low price a small mobile vehicle such as an automatic cleaner for home use in particular.

To measure the amount of movement from images taken by one optical displacement sensor unit, generally, there is a need to perform a computation (matrix computation) accompanied by rotational coordinate conversion since the amount of rotational movement in particular, as well as the existence/nonexistence of rotational movement, is previously unknown. Performing such a computation requires incorporating a microcomputer having high processing ability. The mobile vehicle according to the present invention can reach an arbitrary point by combining a forward/backward rectilinear movement and an in-place rotational movement. The movement control means designates a pattern of movement, and the optical displacement sensor detects the value to be detected in the designated movement pattern. Computations for obtaining the rectilinear movement distance and the turning angle of the mobile vehicle from the detected value are performed according to the known movement patterns designated in advance and can, therefore, be made simpler. That is, the rectilinear movement distance is obtained as a displacement in the front-rear axis from the detected value with respect to the front-rear axis direction when the pattern of movement of the mobile vehicle is designated for the forward/backward rectilinear movement, on the basis of data on changes between the images of the travel floor surface taken by the optical displacement sensor, and the in-place turning angle is obtained by successively integrating the angle estimated about the rotation center axis with respect to each of infinitesimal displacements in the left-right axis direction obtained from the detected value with respect to the left-right axis direction when the pattern of movement of the mobile vehicle is designated for the in-place rotational movement. As a result, the mobile vehicle can incorporate a microcomputer not so high in computation processing ability.

In this mobile vehicle, the optical displacement sensor is a sensor having orthogonal two axes as displacement detection axes. The orthogonal two axes are two axes in the plane in which in-place rotation is performed. In this case, the position on the rotation center axis line when the mobile vehicle performs in-place rotation is such a position that the amount of rotational movement cannot be normally detected when the optical displacement sensor is placed at the position. Therefore, the optical displacement sensor is placed at a position other than the position on the rotation center axis line around which the mobile vehicle performs the in-place rotation.

In this mobile vehicle, the displacement detection axes of the optical displacement sensor are a front-rear axis corresponding to a vehicle front-rear center line passing through the rotation center axis line when the mobile vehicle performs the in-place rotation, and a left-right axis parallel to a vehicle left-right center line passing through the rotation center axis line and perpendicular to the vehicle front-rear center line. That is, in the placement of the optical displacement sensor at a position other than the position on the rotation center line when in-place rotation is performed, the direction of the displacement detection axes formed of the two orthogonal axes of the optical displacement sensor corresponds to a diametrical direction coinciding with the forward/backward rectilinear movement direction and a circumferential direction perpendicular to this direction with respect to the rotation center axis line. In the movement pattern for forward/backward rectilinear movement of the mobile vehicle, the direction of the forward/backward displacement detection axis corresponding to the vehicle front-rear center line coincides with the direction of movement and, therefore, the distance of frontward/backward rectilinear movement can be directly detected. In the movement pattern for in-place rotation of the mobile vehicle, the direction of the left-right displacement detection axis coincides with the direction of rotational movement and, therefore, the turning angle is obtained by successively integrating the estimated angles corresponding to the infinitesimal displacements in the left-right direction with respect to each of the infinitesimal displacements. In either case, the amount of movement can be obtained by a simple integrating operation.

In this mobile vehicle, the optical displacement sensor may be a sensor having a spherical or curved grounding surface. The optical displacement sensor having a spherical or curved grounding surface makes it possible to easily pass over certain irregularities in a floor surface because of the shape of its own ground surface when the mobile vehicle travels on the floor surface.

As described above, one optical displacement sensor for taking images of a travel floor surface is used instead of wheel rotation amount sensors in the mobile vehicle according to the present invention. Thus, spacing saving with respect to the wheel system and a reduction in cost based on a reduction in the number of components can be achieved. Also, placing restrictions on the mobile vehicle movement patterns makes it possible to compute movement displacements of the mobile vehicle, i.e., the distance of forward/backward rectilinear movement and the turning angle in in-place rotation by a low-priced microcomputer not so high in processing ability on the basis of image data detected with one optical displacement sensor. As a result, the manufacturing cost of the mobile vehicle can be further reduced. With respect to the turning angle in-place rotation in particular, the placement of the optical displacement sensor is also devised to enable the amount of movement of the mobile vehicle to be obtained by successively integrating the estimated angle corresponding to the infinitesimal displacement in the left-right axis direction with respect to each of the infinitesimal displacements without requiring high processing ability such as that for rotational coordinate conversion.

DESCRIPTION OF SYMBOLS

Figure 1:
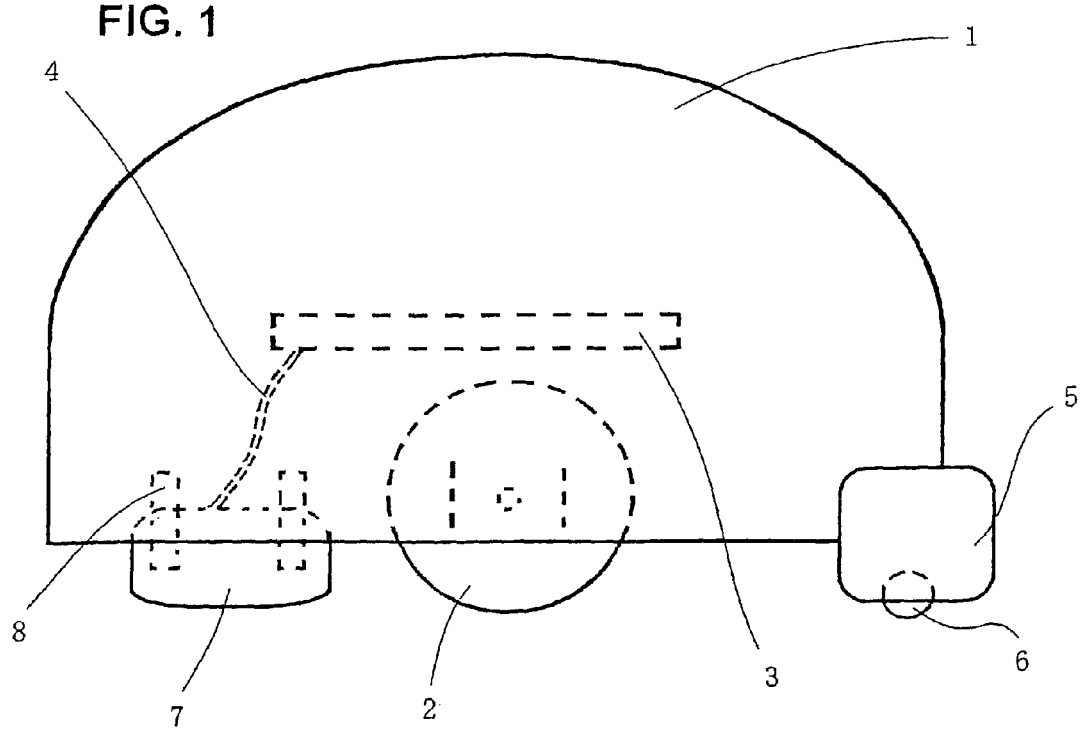
FIG. 1 is a side view showing an example of a mobile vehicle according to the present invention.

1 Main body
2 Driven wheel
3 Control section
4 Data output line
5 Working portion
6 Auxiliary wheel
7 Optical displacement sensor
8 Supporting portion
9 Image sensor (CCD)
10 Lens
11 Light emitting element (LED)

21, 22 Image of floor surface
23 Displacement dX in X-direction
24 Displacement dY in Y-direction
31 Vehicle body left-right center line
32 Vehicle body front-rear center line
33 dY
34 dX
35 Rotation center axis line when in-place rotation is performed

BEST MODE FOR CARRYING OUT THE INVENTION

An embodiment of a mobile vehicle according to the present invention will be described with reference to the accompanying drawings. FIG. 1 is a side view showing an example of an application of the mobile vehicle according to the present invention in which the mobile vehicle is applied as a cleaner. A main body 1 of the mobile vehicle is provided with two driven wheels 2, 2 for traveling opposed to each other in the widthwise direction on a bottom portion thereof. The main body 1 is also provided with auxiliary wheels 6, 6 for supporting the main body 1 at a position remote from the driven wheels 2, in a travel direction, as conventional cleaners. Each driven wheel 2 is rotated by a drive motor (not shown) receiving a control signal from a control section 3. In the case of making a forward movement, the two driven wheels 2, 2 are simultaneously rotated in the forward movement direction. In the case of making a backward movement, the two driven wheels 2, 2 are simultaneously rotated in the backward movement direction. At the time of turning, the two driven wheels 2, 2 are rotated in different directions at the same speed, whereby the mobile vehicle performs in-place rotation. The auxiliary wheels 6, 6 freely rotate like, for example, ball casters to enable the main body 1 to run smoothly along the movements of the auxiliary wheels 6, 6. The mobile vehicle can move to an arbitrary point on a travel floor for example by combining forward/backward, turning and stopping operations, thus freely moving in a room.

A working portion 5 is provided at the front of the main body 1. If the working portion 5 is formed as a suction port for cleaning for example, the mobile vehicle can perform an operation to clean a floor surface. The working portion 5 provided on a main body bottom surface is not exclusively used. The provision of a surveillance camera is also conceivable.

Figure 2:
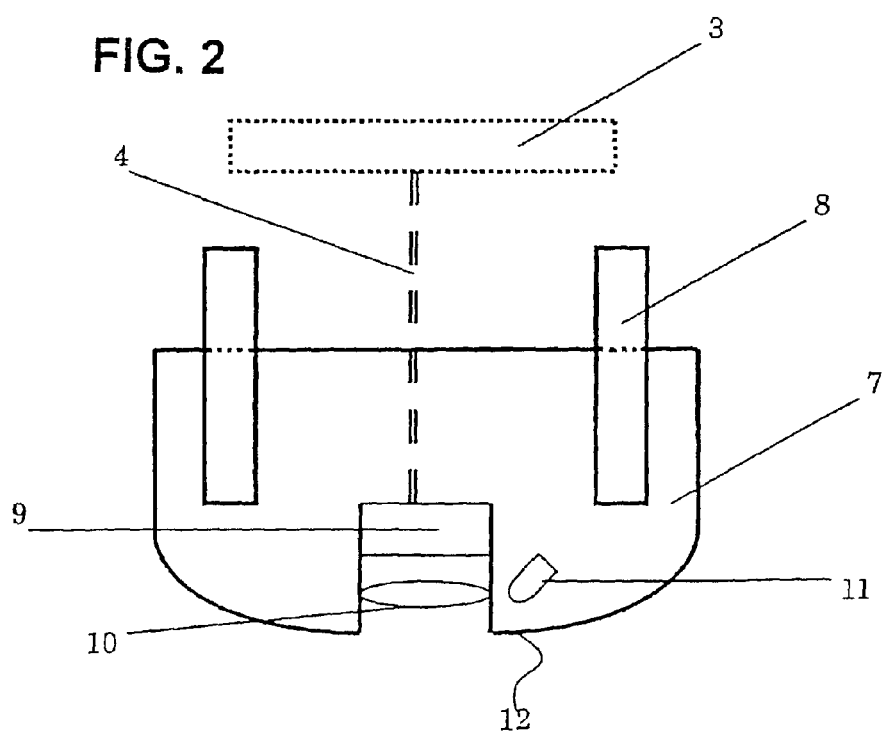
FIG. 2 is a structural diagram of an optical displacement sensor in the mobile vehicle according to the present invention.

The main body 1 is provided on a rear bottom surface portion thereof with an optical displacement sensor 7. FIG. 2 is diagram showing the structure of this optical displacement sensor. Like a conventional optical mouse for example, the optical displacement sensor 7 has a lens 10 for magnifying an object to be imaged, e.g., a floor surface, a light emitting element 11 such as an LED for illuminating the object to be imaged, and an image sensor 9 such as a CCD. The optical displacement sensor 7 can compute and output a displacement of a floor surface by successively taking images in short cycles, e.g., 1000 times or more per second and comparing taken images obtained one after another with time (detailed description will be made later). A distance through which the main body 1 has traveled can be measured by integrating outputs from the image sensor 9 in the control section 3 via a data output line 4. The optical displacement sensor 7 is a sensor for accurately grasping the position of the mobile vehicle relative to a start point. The optical displacement sensor 7 serves for grasping the position in the case of preparing a map of an explored area, for grasping the self-position for return to a start point, and for grasping the self-position on the prepared map.

The optical displacement sensor 7 is supported on the main body 1 by supporting portions 8 and is pressed against a floor surface by a suitable means such as a spring damper.

The optical displacement sensor 7 is supported on the main body 1 by supporting portions 8 and is pressed against a floor surface by a suitable means such as a spring damper. A bottom surface portion 12 to be brought into contact with a floor surface is formed as a spherical or smoothly curved surface. The bottom surface portion 12 smoothly moves up and down by following certain irregularities in a floor surface to enable detection of the amount of movement of the floor surface with stability at all times.

Figure 3:
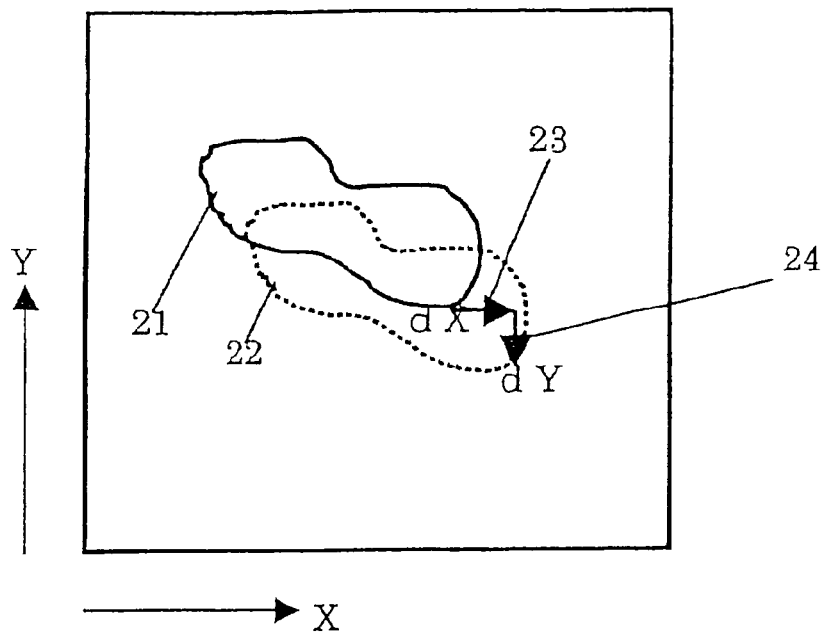
FIG. 3 is a diagram of the principle of the optical displacement sensor in the mobile vehicle according to the present invention.

The principle of the optical displacement sensor 7 will be described with reference to FIG. 3. It is assumed that, for example, an image 21 of a pattern on a floor surface is taken with the image sensor 9 at a certain time and the floor surface pattern image changes to an image 22 with a movement of the main body 1. At this time, the optical displacement sensor 7 compares the image 21 and the image 22 to output a displacement 23 in the X-direction (hereinafter referred to as dX) and a displacement 24 in the Y-direction (hereinafter referred to as dY). The optical sensor 7 repeats taking images at a high speed relative to the speed of the mobile vehicle. Therefore, the two images to be compared is expected to have a similar imaging pattern. This computation may be performed in the control section 3 instead of being performed on the sensor 7 side.

Figure 4:
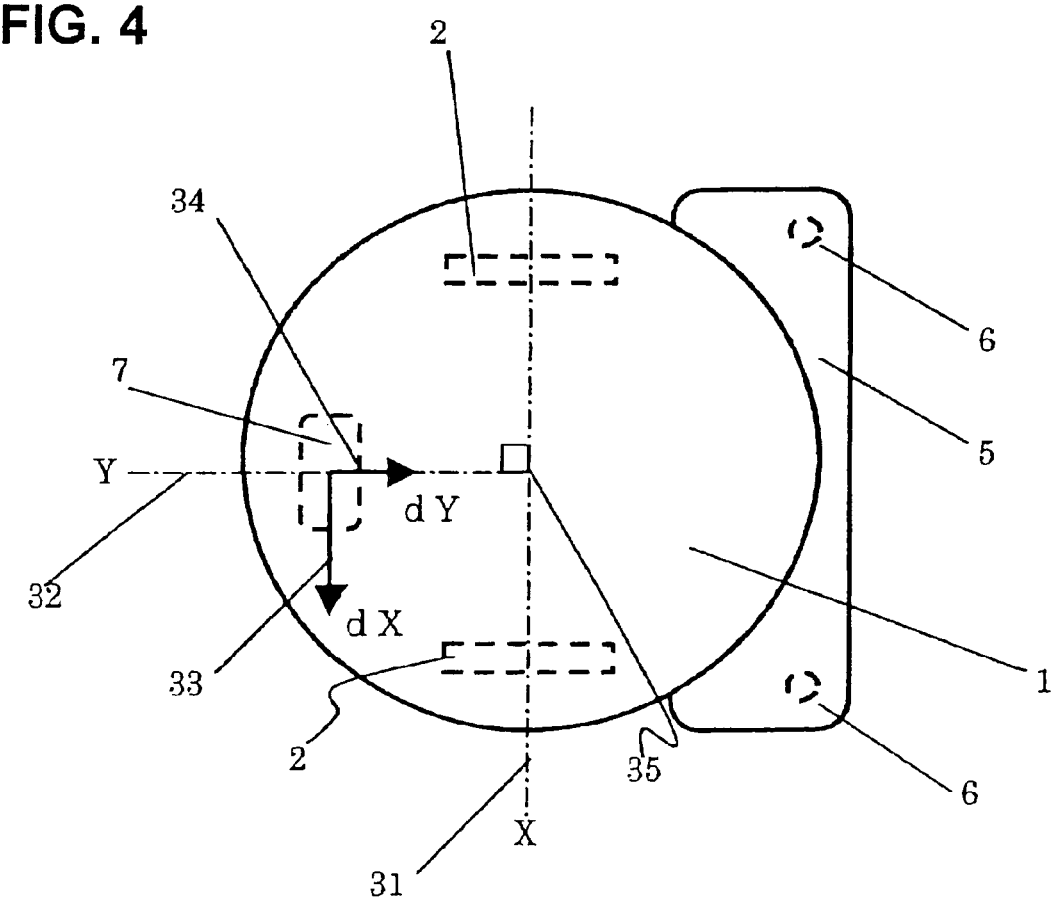
FIG. 4 is a diagram of the placement of the optical displacement sensor in the mobile vehicle according to the present invention.

FIG. 4 is a diagram of placement of the optical displacement sensor in the mobile vehicle. A method of detecting the amount of movement of the main body 1 by using one optical displacement sensor 7 will be described with reference to FIG. 4. In FIG. 4, a line connecting the axles of the left and right driven wheels 2, 2 is a vehicle left-right center line 31, and a line extending perpendicularly from a left-right center point of the wheels 2, 2 on the vehicle left-right center line 31 to forward/backward direction of the main body 1 is a vehicle front-rear center line 32. The vehicle left-right center line 31 and vehicle front-rear center line 32 form two axes perpendicular to each other. An axis line passing through the left-right center point of the wheels 2, 2 on the vehicle left-right center line 31 and perpendicular to a plane defined by the two center lines 31 and 32 is a rotation center axis line 35 in the case of in-place rotation of the mobile vehicle when the wheels 2, 2 are rotated at the same speed in opposite directions.

The optical displacement sensor 7 is mounted so that displacement detection axes X and Y of the image sensor 9 are parallel to the orthogonal two axes on the vehicle. That is, referring to FIG. 4, a displacement detection axis dX 33 of the image sensor 9 is a left-right axis parallel to the direction of the vehicle left-right center line 31, while a displacement detection axis dY 34 of the image sensor 9 is a front-rear axis corresponding to the vehicle front-rear center line 32. Movement modes on which the movement of the mobile vehicle is based are designated in advance as movement patterns so as to enable the amount of movement of the mobile vehicle to be easily computed even if the mobile vehicle incorporates the microcomputer with the not so high processing ability. The movement patterns may be forward/backward rectilinear movements and in-place rotational movement as described above.

According to the above-described placement of the optical displacement sensor 7 and selection from mobile vehicle movement patterns, in the case of a movement pattern in which the main body 1 moves straight forward or backward, the image on the image sensor 9 is displaced only in the Y-axis direction at every moment and dY is output. That is, since the direction of the displacement detection axis coincides with the direction of rectilinear movement, the distance of forward/backward rectilinear movement can be directly detected. In the case of a movement pattern in which the main body 1 performs in-place rotation, the image from the image sensor 9 is displaced only in the X-axis direction at every moment and dX is output. That is, since the direction of the displacement detection axis coincides with the circumferential direction, the amount of movement in in-place rotation (turning angle) can be directly detected. That is, dY represents the infinitesimal rectilinear movement distance in the case of rectilinear movement and dX represents an infinitesimal turning angle in the case of turning. This value is integrated in the control section 3. Thus, measurement of the amount of movement of the main body 1 is enabled with one optical distance sensor 7. The turning angle in in-place rotation is computed by successively integrating the angle estimated about the rotation center axis 35 with respect to each of the infinitesimal displacements. In this movement amount computation, there is no need for matrix computation for making a complicated coordinate conversion. There is no problem with interchange of dX and dY in the above.

If a point of intersection of the vehicle left-right center line 31 connecting the axles and the vehicle front-rear center line 32 is selected for placement of the image sensor 9, any displacement cannot be normally detected when the main body 1 turns. Therefore, the rotation center axis line 35 at the time of in-place rotation is inappropriate as a place in which the optical displacement sensor 7 is set with the center of the image sensor 9 corresponding thereto.

If the displacement detection axes X and Y of the image sensor 9 do not correspond to (obliquely deviate largely from) the orthogonal two axes on the vehicle (left-right center line 31 and front-rear center line 32), the image on the image sensor 9 moves obliquely when the main body 1 moves straight as well as when the main body 1 turns. In either case, therefore, dX and dY are output. Also in this case, the movement distance can be measured by making a rotational coordinate conversion in the control section 3. However, a rotational coordinate conversion is made by performing increased floating-point operations. Therefore, the movement distance can be measured at a speed and accuracy according to the processing ability of the control section 3.

The invention claimed is:

1. A mobile vehicle, comprising:
   a main body;
   moving means for moving the main body, the moving means being provided on the main body;
   a displacement sensor provided on the main body; and
   movement control means for controlling the moving means on the basis of a detected value detected by the displacement sensor,
   wherein the movement control means designates a pattern of movement of the mobile vehicle by the moving means for a forward/backward rectilinear movement or an in-place rotational movement;
   the displacement sensor is only a single optical displacement sensor for taking images of a travel floor surface beneath the main body facing the displacement sensor, the displacement sensor being placed on the bottom of the main body at a position significantly off-center with respect to a rotation center around which the mobile vehicle performs the in-place rotational movement, the displacement sensor has, as displacement detection axes orthogonal two axes formed of a front-rear axis corresponding to a vehicle front-rear center line orthogonal to the rotation center axis line and a left-right axis parallel to a vehicle left-right center line orthogonal to the rotation center axis and perpendicular to the vehicle front-rear center line; and
   the movement control means obtains, at specified time intervals, a forward/backward rectilinear movement distance and an in-place rotation angle, on the basis of data on changes between the images of the travel floor surface taken by the optical displacement sensor, by obtaining a forward/backward rectilinear movement distance as a displacement in the front-rear axis direction from the detected value with respect to the front-rear displacement detection axis direction, and by calculating an in-place rotation angle from displacement in the left-right axis direction obtained from the detected value with respect to the left-right displacement detection axis direction; and
   wherein the movement control means obtains a current position of the mobile vehicle with respect to a starting point by integrating the obtained displacement in the front-rear axis direction and the obtained displacement in the left-right axis direction.

2. The mobile vehicle according to claim 1, wherein the optical displacement sensor has a spherical or curved surface that makes contact with the floor surface.

3. The mobile vehicle according to claim 1, wherein the optical displacement sensor has a body having a recess facing the floor surface, a CCD disposed inside the recess, and an LED that emits light against the floor surface.

4. The mobile vehicle according to claim 1, wherein the optical displacement sensor aims directly at the floor surface.

5. The mobile vehicle according to claim 1, wherein a resilient supporting member is provided for urging the displacement sensor against the floor surface, and the resilient supporting member is a spring damper.

6. The mobile vehicle according to claim 1, further comprising:
   a working portion provided at one side of the main body with respect to the moving means,
   wherein the working portion is a suction port.

7. The mobile vehicle according to claim 6, wherein the displacement sensor is provided at a side opposite to the one side with respect to the moving means, and a distance between the displacement sensor and the moving means is shorter than a distance between the working portion and the moving means.

8. The mobile vehicle according to claim 1, wherein the optical displacement sensor picks up images including patterns on the travelling floor surface at the specific time intervals, and the movement control means detects a moving distance by comparing images before and after the specified time interval.

* * * * *